US012718084B2

(12) United States Patent
Heinzemann et al.

(10) Patent No.: US 12,718,084 B2
(45) Date of Patent: Aug. 25, 2026

(54) COMPUTER-IMPLEMENTED METHOD AND DEVICE FOR MACHINE LEARNING

(71) Applicant: Robert Bosch GmbH, Stuttgart (DE)

(72) Inventors: Christian Heinzemann, Ludwigsburg (DE); Christoph Gladisch, Renningen (DE); Martin Herrmann, Korntal (DE); Matthias Woehrle, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 955 days.

(21) Appl. No.: 17/166,532

(22) Filed: Feb. 3, 2021

(65) Prior Publication Data

US 2021/0248464 A1 Aug. 12, 2021

(30) Foreign Application Priority Data

Feb. 10, 2020 (DE) ......................... 102020201605.4

(51) Int. Cl.
*G06N 3/08* (2023.01)

(52) U.S. Cl.
CPC ..................................... *G06N 3/08* (2013.01)

(58) Field of Classification Search
CPC ........................................................ G06N 3/08
See application file for complete search history.

(56) References Cited

U.S. PATENT DOCUMENTS

2019/0156216 A1* 5/2019 Gupta .................... G06N 3/126
2020/0042434 A1* 2/2020 Albertson .............. G06V 10/82

OTHER PUBLICATIONS

Yunming Ye, "Stratified sampling for feature subspace selection in random forests for high dimensional data", 2012 (Year: 2012).*
Spiegler, "Machine Learning for the Analysis of Morphologically Complex Languages" (Year: 2011).*
Zimmermann, M., et al., "Mastering the Complexity of Engine Control Functions," MTZ Worldwide, Development Engine Management, vol. 76, No. 1, 2015, pp. 38-41.
Etas Gmbh, "Scode-Analyzer—Software for Displaying Complex Relationships in Control Systems," pp. 1-2. Downloaded Feb. 1, 2021 <https://www.etas.com/en/products/scode-analyzer.php>.
Czerwonka, J., "Pairwise Testing in Real World," Microsoft Corporation, 2006, pp. 1-12. Downloaded Feb. 1, 2021 https://openaccess.thecvf.com/content_CVPRW_2020/papers/w20/Gladisch_Leveraging_Combinatorial_Testing_for_Safety-Critical_Computer_Vision_Datasets_CVPRW_2020_paper.pdf.
Gladisch et al., "Leveraging Combinatorial Testing for Safety-Critical Computer Vision Datasets," IEEE, 2020, pp. 1-8.

(Continued)

*Primary Examiner* — Van C Mang
(74) *Attorney, Agent, or Firm* — NORTON ROSE FULBRIGHT US LLP

(57) ABSTRACT

A device and a computer-implemented method for machine learning. First input data are provided which encompass information concerning dimensions and options for the machine learning. At least one of the options is associated with at least one of the dimensions as a function of information concerning the dimensions and options for at least one test case for the machine learning. A combination of options for a subset of the dimensions that is lacking in the set of test cases is determined, and a test case is determined for this combination.

12 Claims, 3 Drawing Sheets

(56) References Cited

OTHER PUBLICATIONS

Amersbach et al., "Functional Decompostition—A Contribution to Overcome the Parameter Space Explostion During Validation of Highly Automated Driving," Traffic Injury Prevention, vol. 20, No. S1, 2019, pp. 52-57.

Tuncali et al., "Simulation-Based Adversarial Test Generation for Automous Vehicles With Machine Learning Components," IEEE Intelligent Vehicles Symposium (IV), 2018, pp. 1555-1562.

* cited by examiner

| | | | | | |
|---|---|---|---|---|---|
| time of day 402 | morning 422 | midday 424 | evening 426 | night 428 | |
| mist/fog 404 | YES 430 | NO 432 | | | |
| road condition 406 | dry 434 | wet 436 | icy 438 | snow-covered 440 | damaged 442 |
| sky condition 408 | cloudy 444 | undefined 446 | clear 448 | | |
| rain 410 | YES 450 | NO 452 | | | |
| reflection on roadway 412 | YES 454 | NO 456 | | | |
| shadows on roadway 414 | YES 458 | NO 460 | | | |
| subject type 416 | adult 462 | child 464 | | | |
| subject category 418 | pedestrian 466 | jogger 468 | cyclist 470 | | |
| subject contrast to background 420 | low 472 | high 474 | | | |

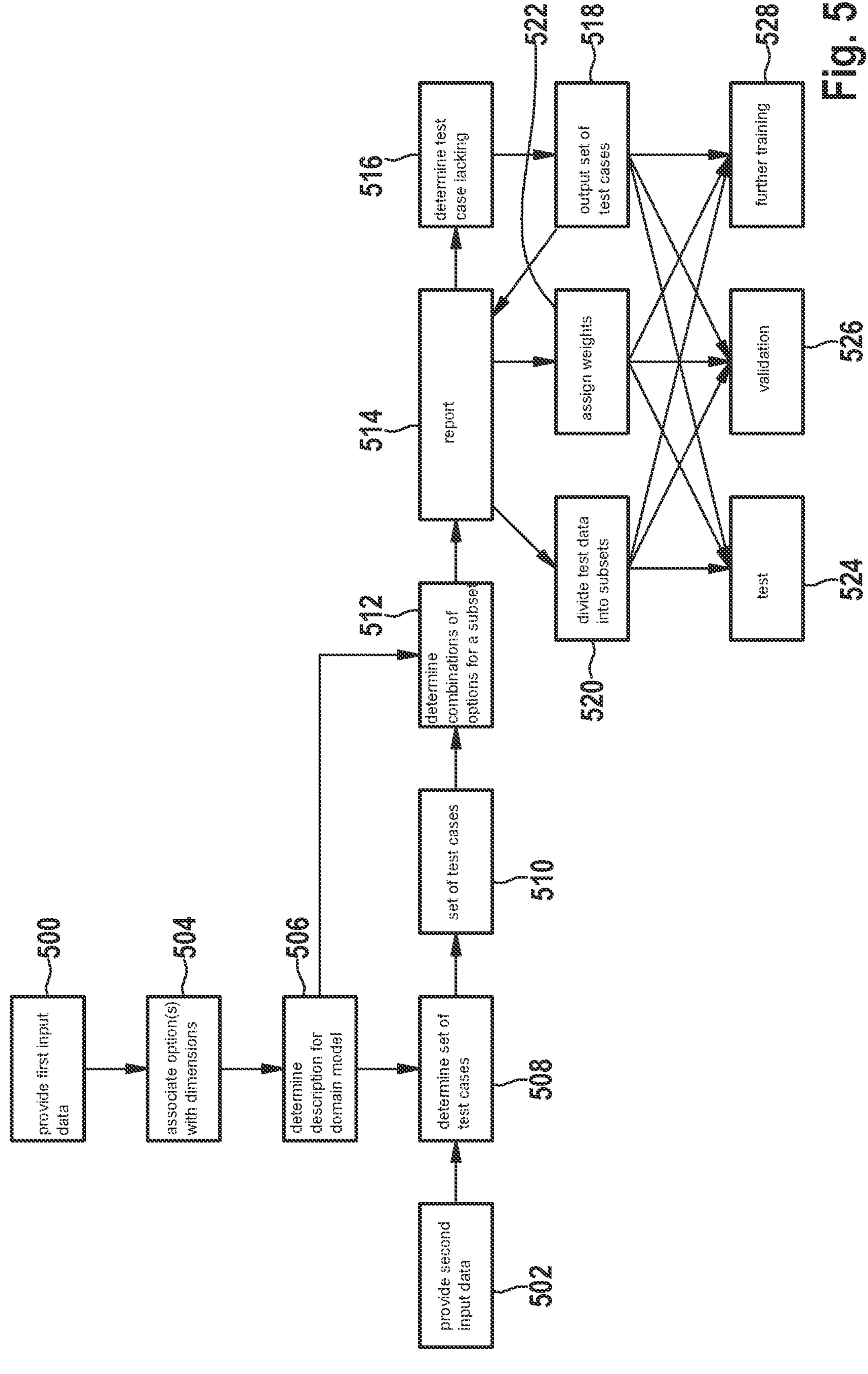
provide first input data
500
associate option(s) with dimensions
504
determine description for domain model
506
provide second input data
502
determine set of test cases
508
set of test cases
510
determine combinations of options for a subset
512
report
514
determine test case lacking
516
output set of test cases
518
assign weights
522
divide test data into subsets
520
test
524
validation
526
further training
528
Fig. 5

COMPUTER-IMPLEMENTED METHOD AND DEVICE FOR MACHINE LEARNING

CROSS REFERENCE

The present application claims the benefit under 35 U.S.C. § 119 of German Patent Application No. DE 102020201605.4 filed on Feb. 10, 2020, which is expressly incorporated herein by reference in its entirety.

FIELD

The present invention is directed to a method and a device for machine learning.

BACKGROUND INFORMATION

Machine learning is a form of artificial intelligence (AI) that allows a system to learn from data and not via explicit programming. In machine learning, a model, for example a machine learning algorithm, is trained based on the data. The trained model represents a predictive model or a recognition function, for example. When the model is provided with data, by use of the model the system makes a prediction or recognizes a situation, for example.

Creating reliable models of satisfactory quality represents a considerable challenge. It is therefore desirable to provide an option which achieves the prerequisites for creating reliable models of satisfactory quality and allows the creation of reliable models.

SUMMARY

This may be achieved by an example embodiment of the present invention.

In accordance with an example embodiment of the present invention, a computer-implemented method for machine learning provides that first input data are provided which encompass information concerning dimensions and options for the machine learning, at least one of the options being associated with at least one of the dimensions as a function of information concerning the dimensions and options for at least one test case for the machine learning, a combination of options for a subset of the dimensions that is lacking in the set of test cases being determined, a test case being determined for this combination. Possible states of a domain model for the machine learning are defined by a set of all permissible combination possibilities for the dimensions and options. Determining test cases for all possible states is very complicated since it is an exponential process. A model for the machine learning may be defined by a subset and dimensions and their options. For the practical creation of models of satisfactory quality, it is sufficient to determine test cases for only a subset of states. The subset may in principle be determined by random selection from all possible states. States with which a k-wise coverage is achieved by the test cases are preferably selected for the subset of states. A k-wise coverage is provided when, for each subset of dimensions of value k, in each case for each combination of options of these dimensions, at least one test case with this combination exists which is contained in the set of test cases.

Second input data are preferably provided which encompass at least one test case, and the set of test cases being determined from the second input data as a function of at least one test case. In this way, the set of test cases may be initialized based on already existing test cases.

In one aspect of the present invention, a number of dimensions or options is selected from a plurality of dimensions or options as a function of a weighting that characterizes an importance for the machine learning. This allows creation of a reliable model of satisfactory quality, with computing time that is reduced compared to the use of all dimensions and options.

At least one subset of dimensions is preferably determined as a function of at least one constraint that defines at least one permissible and/or at least one impermissible combination of multiple dimensions or options. The constraint reduces the number of states to the states that are meaningful, important, or necessary for the machine learning.

A k-wise coverage of states is preferably determined by the set of test cases, k defining the number of dimensions that are combined with one another in a subset of the dimensions. This allows a particularly efficient reduction of the number of test cases.

In one aspect of the present invention, at least one combination of multiple dimensions for the k-wise coverage is determined in compliance with the at least one constraint. The computing time is reduced due to the constraint.

A check is preferably made as to whether the set of test cases encompasses at least one test case for each of the subsets of the plurality of subsets of the dimensions. The test cases are thus determinable in a particularly satisfactory manner.

A subset of the dimensions that is not yet covered by a test case of the set of test cases is preferably determined, at least one test case being determined for the not yet covered subset of dimensions. A not yet covered state is covered in this way.

In one aspect of the present invention, a test case is defined by a combination of a first option with a second option, the first option being an option from a first plurality of options that is defined for a first dimension, the second option being an option from a second plurality of options that is defined for the first dimension or for a second dimension. This combination is particularly suited for the machine learning.

In one aspect of the present invention, first test cases of the set of test cases are defined by options for a first dimension and a second dimension, second test cases being determined that are defined by options for the first dimension, the second dimension, and a third dimension, the first test cases for determining the second test cases being associated with an option for the third dimension. An expansion by an additional dimension is thus achieved without having to redetermine the test cases that are already known.

A number of specific test cases for a set of specific test cases is preferably determined for at least one test case from the set of test cases. In this way, data are generated that may be used for the test, for validation, or for training in the machine learning.

A weight is preferably determined as a function of the number of specific test cases, the set of specific test cases being divided into subsets, at least one specific test case of the plurality of specific test cases being associated or not associated with one of the subsets as a function of the weight. In this way, an over- or underrepresentation of specific test cases in the subsets is avoided or achieved.

A plurality of specific test cases is preferably determined as training data for a training, as validation data for a validation, or as test data for a test for machine learning. The subsets are used for different purposes in the machine learning.

In accordance with an example embodiment of the present invention, a device for machine learning is designed to carry out the method.

Further advantageous specific embodiments result from the description below and the figures.

BRIEF DESCRIPTION OF THE DRAWINGS

FIG. 5 shows a flowchart for generating test cases, in accordance with an example embodiment of the present invention.

DETAILED DESCRIPTION OF EXAMPLE EMBODIMENTS

Figure 1:
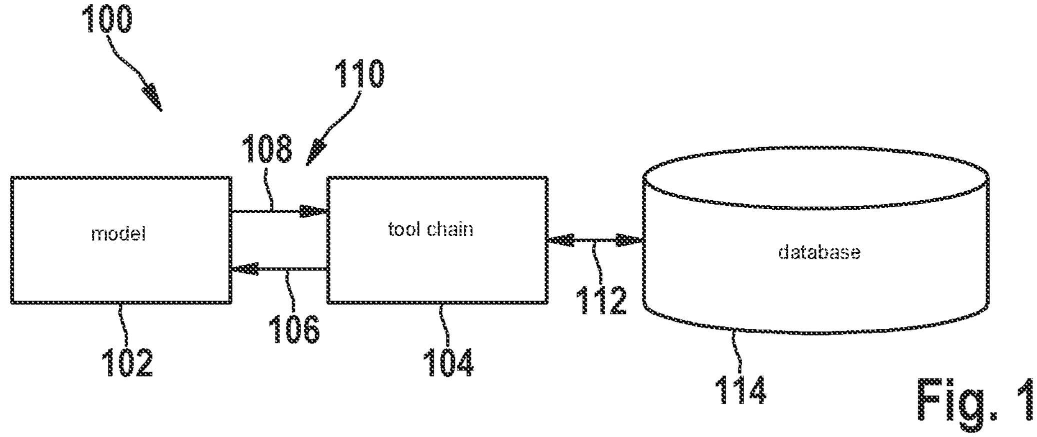
FIG. 1 shows a schematic illustration of a test environment, in accordance with an example embodiment of the present invention.

FIG. 1 schematically illustrates a system 100 for machine learning, in accordance with an example embodiment of the present invention. System 100 includes a model 102. Model 102 may encompass an artificial neural network, for example.

In one aspect of the present invention, system for machine learning 100 includes a tool chain 104. Tool chain 104 is usable for machine learning, for example. Tool chain 104 is designed to generate training data and/or validation data for the machine learning. Tool chain 104 may be designed to test model 102 using the test data, and/or to validate the model using the validation data.

Tool chain 104 may be designed to generate training data for the machine learning. Tool chain 104 may be designed to train model 102 using training data.

In the example, model 102 is designed to classify input data 106. Model 102 may be used independently of tool chain 104.

Tool chain 104 is implemented, for example, as a systematic collection of tool programs that are used to generate the test data. Tool programs may be provided that create or generate training data. Tool programs for training, for the test, and/or for use of model 102 for classification may be provided.

Model 102 is designed to determine output data 108 of model 102 as a function of input data 106 for model 102. Input data 106 may represent an input at an input layer of the artificial neural network. The output data may represent an output of the artificial neural network at an output layer. In the example, the artificial neural network includes at least one concealed layer that is situated between the input layer and the output layer.

Tool chain 104 is designed to determine input data 106 for model 102. Tool chain 104 is designed to process output data 108 of model 102. In the example, an interface 110 between tool chain 104 and model 102 allows a transfer of input data 106 from tool chain 104 to model 102. In the example, interface 110 allows a transfer of output data 108 from model 102 to tool chain 104.

Model 102 may be designed to determine output data 108 independently of tool chain 104. After conclusion of a training of model 102, for example input data 106 are provided by a system that uses trained model 102, and output data 108 are further processed by this system.

In the example described below, model 102 is usable by a system for controlling or regulating. In the example described below, model 102 represents a recognition function. The recognition function is intended to be usable for safety-critical applications, for example. The safety-critical application is designed, for example, for at least semi-autonomous driving, in particular of a motor vehicle or robot. In the example, the recognition function is a classification function via which digital images are classifiable into classes. In the example, the classes define situations in which the system is intended to be usable for controlling or regulating. Model 102 may also represent a predictive function via which predictions for trajectories of vehicles, persons, or other objects, for example, are possible.

In the present example, input data 106 are digital images. In the present example, output data 108 define one or multiple classes. In the example, the digital images are defined by images that have been detected by a digital camera, a LIDAR sensor, a radar sensor, or an ultrasonic sensor. These images are stored in a database 114, for example.

In the present example, tool chain 104 and database 114 are connectable via an interface 112. Tool chain 104 is designed to withdraw digital images as training data or test data from database 114.

Input data 106 may be defined by a vector which for each pixel of a digital image has a value that defines the content of the pixel. The pixels are concatenated into the vector line by line, for example. For images with various color channels, these may be successively concatenated into the vector. A tensor may also be used which has dimensions for individual lines and/or color channels.

Output data 108 may be defined by a vector in which each element is unambiguously associated with a class. A value of an element indicates, for example, a probability for the class with which this element is associated.

For input data 106, i.e., in the present example a vector or tensor that represents a digital image, model 102 is designed to output output data 108, i.e., in the present example a vector that indicates the probabilities for the classes into which model 102 may classify digital images.

In the present example, digital images represent depictions of a reality in which scenarios are contained. In the example, classes are to be associated with the scenarios. For example, in response to detecting a digital image, an action is to be carried out as a function of the class having the highest probability. A data set with a large number of digital images is necessary for a training, a test, and a validation of such recognition functions. The data set must also contain digital images with a sufficient variety of different scenarios.

An objective of the machine learning is to achieve a sufficient coverage of the scenarios in order for the recognition function to also reliably classify unknown digital images.

In the example, for the data set a plurality of states of a domain model in a state space is defined. In the example, a state is defined by a dimension or multiple dimensions of the state space. For assessing the coverage that is achieved in the training, in the test, or in the validation using samples, i.e., digital images, a distribution for a plurality of the images of the data set in the state space may be determined. In particular, a variance with regard to the dimensions and the associated states of the domain model must be ensured.

The coverage increases with an increasing quantity of digital images and/or with increasing variation of the digital images. The variation increases, for example, when the number of scenarios, contained in the digital images that are used in the training or in the validation, increases.

A variation in the test data and/or the validation data that is particularly well suited for machine learning is achieved by the procedure described below. A similar procedure may be provided for the training data.

Figure 2:
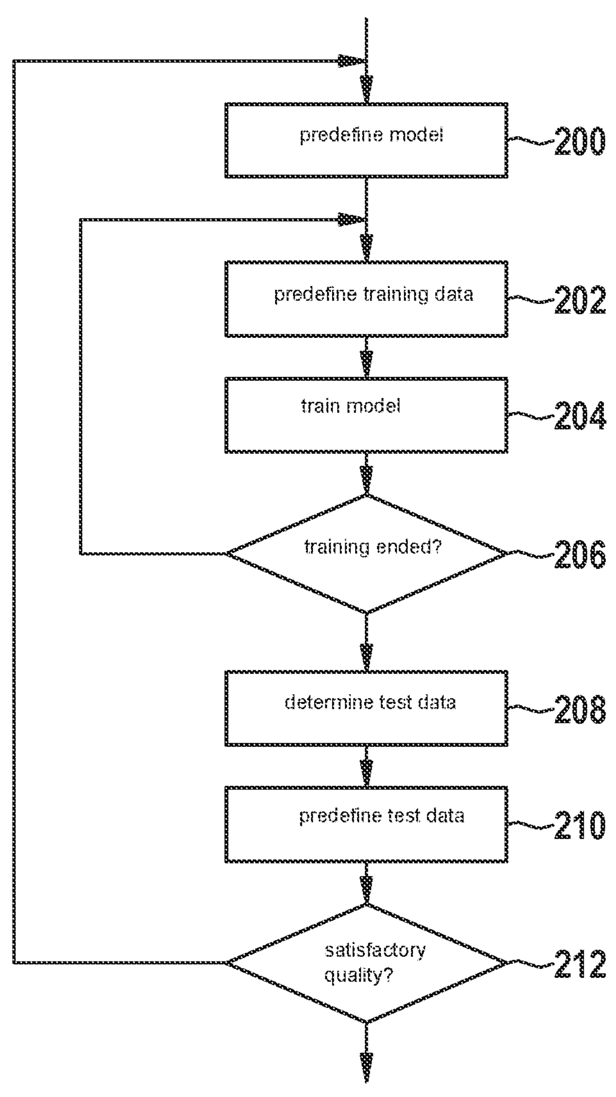
FIG. 2 shows steps in a method for machine learning, in accordance with an example embodiment of the present invention.

FIG. 2 illustrates steps of a method for machine learning in which this procedure is usable.

Model 102 is predefined in a step 200. In the example, model 102 is implemented as an artificial neural network whose topology is predefined via hyperparameters. In the example, model 102 is determined using tool chain 104. The specification of model 102 is described in greater detail below.

Within the scope of the machine learning, it is provided that training data for the machine learning are predefined in a step 202. As described below with reference to FIG. 5, the specification of training data and/or a specification of validation data for a validation in the training may be carried out in particular to guarantee the coverage in the training data and/or validation data. The training data include samples which in the example are digital images. A sample preferably includes a digital image and a description. For example, metadata are provided as a description. In the example, the training data are withdrawn from database 114. In the example, various training data are, for example, randomly withdrawn from database 114.

It may be provided to determine the samples for the training data via a simulation environment for the system during the method. The samples may also originate from a field test that is carried out for collecting the training data.

Model 102 is subsequently trained, based on the training data, in a step 204. In the present example, the training takes place using a gradient descent method, for example ADAM, based on the training data. In the gradient descent method, the parameters of model 102, in the example the weights of the artificial neural network, are determined which for the training data minimize a loss function of the gradient descent method.

A check is subsequently made in a step 206 as to whether or not the training for this model 102 has ended. The training is ended, for example, when all training data have been used or a maximum number of training passes is achieved. When the training for this model 102 has ended, a step 208 is carried out.

Otherwise, step 202 is carried out.

Test data for the machine learning are subsequently determined in step 208. The test data include samples, in the example digital images. In the example, the test data are determined via a simulation environment for the system, in particular during the method. The samples may be determined in the simulation environment, or also in a field test independently of the method. In the example, the samples for the test data are determined using tool chain 104 or are selected from existing samples whose variation achieves a particularly good coverage. As described below with reference to FIG. 5, the specification of test data may be carried out in particular to guarantee the coverage in the test data. The procedure for this purpose is described below.

The test data for the test of model 102 are subsequently predefined in a step 210. This means that model 102, trained using the training data, is tested using the samples, in the example digital images, from the test data. A similar procedure may be used for a validation.

For example, a value of the loss function for the parameters of the artificial neural network is determined as a function of the test data.

A check is subsequently made in a step 212 as to whether model 102 has a satisfactory quality. For example, the value of the loss function for the parameters, determined as a function of the test data, is used for assessing the quality of model 102. For example, this value is compared to a threshold value. If model 102 has a satisfactory quality, the test is regarded as successful and is ended. For example, the quality is satisfactory when the value falls below the threshold value. Otherwise, step 200 is carried out.

In the example, the training is iteratively repeated using different models, for example until the satisfactory quality is achieved, or all available or predefinable models have been predefined. In the example, the training for model 102 is iteratively repeated using different training data. For different models, the same training data may be used.

The steps of the method may run in this order or in some other order. All steps do not have to be executed in each iteration. For a consistent, satisfactory quality it may be provided to determine specific test cases for the domain model as described below, and to distribute them over subsets of the domain model.

Figure 3:
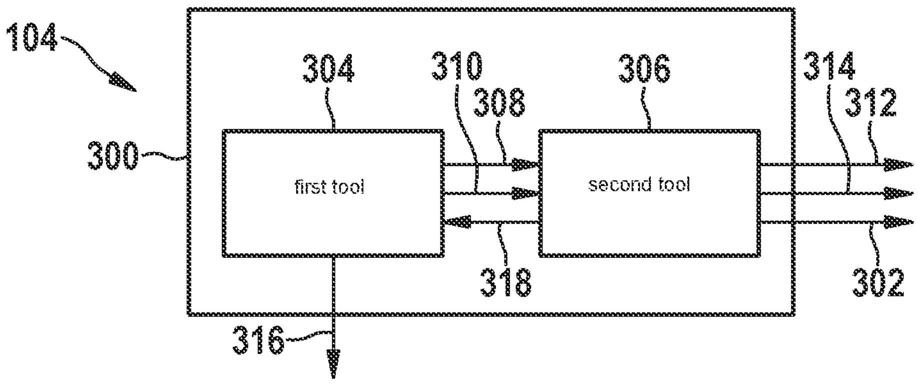
FIG. 3 shows a schematic illustration of a portion of a tool chain, in accordance with an example embodiment of the present invention.

FIG. 3 shows a schematic illustration of a portion 300 of tool chain 104. Portion 300 illustrated in FIG. 3 relates to a determination of test cases 302 for the test of model 102. A similar portion may be provided for the training data and the validation data.

Portion 300 includes a first tool 304 for a morphological analysis of a domain. First tool 304 is designed to manage and/or generate a plurality of models based on a result of the morphological analysis of the domain.

First tool 304 may be designed to predefine model 102 for the method described above. In the example, first tool 304 is designed to predefine model 102 in various iterations of this method, using different hyperparameters and/or weights.

For example, the hyperparameters and/or weights of an artificial neural network are determined by first tool 304. In the example, first tool 304 is designed to determine hyperparameters and/or weights in a model state space for the plurality of models.

In the example, model 102 includes a domain model and constraints for same. The constraints may be defined as fixed rules.

In the example, the domain model is made up of one or multiple Zwicky boxes. In the example, each Zwicky box includes one or multiple dimensions. In the example, each dimension is occupiable by one or multiple options. In the example, each option is a value occupancy for one dimension. Each state is a value occupancy of all options for all dimensions.

In the example, a constraint is a boundary condition that defines a permissible or impermissible combination of options of a Zwicky box from various Zwicky boxes. For example, certain states may be excluded in this way.

First tool 304 is designed to determine the domain model and constraints for same via the morphological analysis of the domain.

Figure 4:
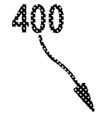
FIG. 4 shows aspects of a domain model, in accordance with an example embodiment of the present invention.

An example of a submodel 400 of the domain model is described, using the example of FIG. 4. Submodel 400 illustrated in FIG. 4 includes 11,520 possible states. Each of these states is defined by one of the possible combinations of options. In the example, submodel 400 includes the following dimensions:

Time of day 402

Mist/fog 404

Road condition 406

Sky condition 408

Rain 410

Reflection on the roadway 412

Shadows on the roadway 414

Subject type 416

Subject category 418

Subject contrast to the background 420

In the example, dimension time of day 402 includes options morning 422, midday 424, evening 426, and night 428.

Dimension mist/fog 404 includes options mist/fog: YES 430 and NO 432.

Dimension road condition 406 includes options dry 434, wet 436, icy 438, snow-covered 440, damaged 442.

Dimension sky condition 408 includes options cloudy 444, undefined 446, clear 448. Undefined 446 refers to an option that occurs at night, for example, when it is not discernible whether the sky is clear or cloudy.

Dimension rain 410 includes options rain: YES 450 and NO 452.

Dimension reflection on the roadway 412 includes options reflection: YES 454 and NO 456.

Dimension shadows on the roadway 414 includes options shadows: YES 458 and NO 460.

Dimension subject type 416 includes options adult 462 and child 464.

Dimension subject category 418 includes options pedestrian 466, jogger 468, and cyclist 470.

Dimension subject contrast to the background 418 includes states low 472 and high 474.

These are aspects of a traffic scenario.

In the example, a SCODE tool according to M. Zimmermann, T. Bleile, F. Heiber, and A. Henle, "Mastering the complexity of engine control functions," MTZ worldwide, Vol. 76, No. 1, pp. 38-41, 2015, is used as first tool 304. In the example, a SCODE Analyzer according to ETAS GmbH, "SCODE-software for describing and visualizing complex closed-loop control systems," 2019, https://www.etas.com/scode, is used for this purpose.

The domain model is modeled with the aid of a SCODE Zwicky box or multiple of these boxes, for example.

For the traffic scenario, using submodel 400 for a digital image on which a child is crossing an intersection in daylight, a test case may be defined by time of day 402: day 422, mist/fog 404: NO 430, road condition 406: dry 434, sky condition 408: cloudy 444, rain 410: NO 450, reflection on the roadway 412: NO 454, shadows on the roadway 414: NO 458, subject type 414: child 464, subject category 416: pedestrian 466, subject contrast to the background 418: high 474.

Further submodels may be provided. For example, for a roadway a submodel "roadway" having the following dimensions is defined in the traffic scenario:

Roadway type

Orientation of the roadway

Shape of the roadway

Height profile of the roadway

Length of the roadway

In a test using the test cases, 11,520 test cases are necessary to achieve a complete coverage of all possible states of the domain model. In the example, for a pairwise test, i.e., a test in which one test case is used for each combination of two of the dimensions with one another, of the 11,520 possible test cases only 9,216 test cases are necessary to achieve a complete coverage. In the case of the pairwise test, one criterion for selecting the test cases with which the complete coverage is achieved is to use exactly one test case for each possible combination of two of the dimensions with one another. This means that out of the possible test cases, selected test cases are determined that satisfy this criterion. Some other criterion may be defined for tests other than the pairwise test. For example, the criterion for a k-wise test is defined by every possible combination of k of the dimensions.

A procedure for reducing the number of test cases is described below with reference to a second tool 306 of portion 300.

In the example, second tool 306 is designed to map the state space for the domain model onto a combinatorial state space, taking the constraints into account. As a result of the constraints, the number of possible states is reduced compared to the number of states that are not limited by the constraints. For example, a constraint may be defined which predefines or excludes a combination possibility of options, and which thus reduces the number of possible states.

For the aspects of the traffic scenario, for example for dimension road condition 406 and dimension reflection on the roadway 412, a relationship may be defined according to which option wet 436 or option icy 438 always occurs with the option reflection: YES 454.

In the present example, second tool 306 is designed to determine a number of test cases that is reduced compared to the number of combination possibilities of all options of all dimensions of all test cases. In the example, the number is reduced by 2,304.

Second tool 306 may be designed to determine specific test cases as a function of the reduced number of test cases. One specific test case is, for example, a digital image or a signal that is synthetically generated using the options from the test case or selected from specific test cases that are already present. When a specific test case such as a digital image is synthetically generated, the associated test case including all options is stored. For existing specific test cases, the associated test case and the associated options of the dimensions may either be derived via existing metadata of the specific test case, algorithmically derived from the specific test case, or determined by manual annotation.

First tool 304 may be designed to determine, as a function of already known test cases, starting values for determining at least one further test case by second tool 306. The starting values for the determination may be defined by already known test cases.

For the traffic scenario, for the digital image on which the child is crossing the intersection in daylight, a starting value may be defined by test case time of day 402: day 422, mist/fog 404: NO 430, road condition 406: dry 434, sky condition 408:

cloudy 444, rain 410: NO 450, reflection on the roadway 412: NO 454, shadows on the roadway 414: NO 458, subject type 414: child 464, subject category 416: pedestrian 466, subject contrast to the background 418: high 474.

Other starting values may be defined by other test cases.

Preferably only test cases that have not already been used for determining the starting value are determined. The test cases that have been used for determining the starting value may be added to the further test case or to the further test cases. These test cases thus supplement the further test case or the further test cases determined by second tool 306.

Second tool 306 may be designed to determine the set of test cases as a function of the domain model. Second tool 306 may be designed to determine the set of test cases as a function of a plurality of submodels that are determined by first tool 304. In the example, for the traffic scenario, submodel 400 is transferred from first tool 304 to second tool 306.

Second tool 306 may be designed to determine submodel 400 in the combinatorial state space. In the example, it may be provided to combine the submodels in particular hierarchically in the combinatorial state space. For example, the constraint may define which submodel is combinable with which other submodel.

For example, the submodel "road" and the submodel "roadway" are combinable with one another to form a test case. Second tool 306 may be designed to determine the test case by selecting a combination of two or more different dimensions. In the example, second tool 306 is designed to determine test cases by pairwise combination of options of two different dimensions.

In the example, the submodel "road" includes seven dimensions with 272,160 possible combinations of options. For a complete coverage, in this case second tool 306 determines 185 test cases with the pairwise combination. In the example, the submodel "roadway" includes eight dimensions with 6,804,000 possible combinations of options. For a complete coverage, in this case second tool 306 determines 210 test cases with the pairwise combination.

Approximately $1.85 \times 10^{12}$ states are defined by the combination of all options of the 15 dimensions of these submodels. For a complete coverage, in this case second tool 306 determines 420 test cases with the pairwise combination.

It may be provided to additionally use the submodel "friction coefficient of the road." In this case, a new test case is defined. In the example, the new test case is supplemented with the submodel "friction coefficient of the road." The test case "friction coefficient of the road" includes a dimension with four options.

$7.407 \times 10^{12}$ states are possible due to the combination of all options of all dimensions of the new submodel. This means that the number of states of the domain model is increased by a factor of 4.

It may be provided to reuse the previously determined test cases. In the example, this means that the previously determined test cases are predefined for the second tool 306 as starting values. Since a dimension "friction coefficient" was not previously defined, this dimension remains disregarded in the prior test cases. Under the assumption that this corresponds to a "normal" option of the dimension "friction coefficient," second tool 306 determines no new test cases for this purpose. Rather, the previously determined test cases are selected from the starting values and used as a new test case. In the present example, the number of test cases to be additionally determined by the submodel "friction coefficient of the road" is 63. The total number of test cases predefined by second tool 306 is 420.

In this case, the additionally determined test cases replace previously determined test cases, at least in part. As a result, for the same number of test cases a variation of the test cases over the additional dimension is achieved.

Second tool 306 may be designed to determine a starting value coverage. In the example, the starting value coverage is a coverage of the reduced number of test cases due to the starting values. In the example, for this purpose a ratio of starting values to the reduced number of test cases determined by second tool 306 is defined. The starting value coverage is determined, for example, as a function of the number of states that are already covered by a determined set of starting values for test cases. In the example, the number of states indicates the quality of the coverage.

In the example, a combinatorial tool PICT according to J. Czerwonka, "Pairwise testing in real world" in 24th Pacific Northwest Software Quality Conference, Vol. 200, 2006, is used as second tool 306.

This second tool 306 provides information concerning the combinatorial state space, and allows provision of test cases for a complete k-wise coverage, in particular taking possible constraints into account. k denotes the number of combined dimensions of the domain model. In the previously described example of the pairwise test, k=2.

In the example, first tool 304 is designed to transfer the domain model to second tool 306 via a domain model interface 308. In the example, first tool 304 is designed to transfer the starting value or the starting values to second tool 306 via a starting value interface 310. In the example, second tool 306 is designed to receive the domain model via domain model interface 308. In the example, second tool 306 is designed to receive the starting value or the starting values via starting value interface 310.

In one aspect, second tool 306 includes an output interface 312 for the combinatorial state space. In one aspect, second tool 306 includes an output interface 314 for the starting value coverage.

A transfer, i.e., a re-import, of test cases from second tool 306 into first tool 304 via a re-import interface 318 may be provided. In this way, already existing test cases may be taken into account as starting values in a particularly efficient manner.

Aspects for a generation of test cases are described below with reference to a flowchart in FIG. 5. An iterative repetition of the generation of test cases may be provided.

The example is described for a visible domain. In the present context, "visible" means in particular visible to humans. In the example of at least semi-autonomous driving, the visible domain includes, for example, domain knowledge that is detectable by a camera, for example, and that is detected in the form of digital images, for example. If other sensors, for example for radar, LIDAR, or ultrasound, are used, the domain may also include digital images that are detected by these sensors. The procedure described below is likewise applicable to these digital images.

First input data 500 that encompass information concerning dimensions and options for the machine learning, in particular for defining states, are provided in a first step. This may take place within the scope of a user input via first tool 304. First input data 500 include domain knowledge. First input data 500 may encompass a set of example test cases, for example boundary cases. The first input data may represent expert knowledge or a set of possible dimensions and associated options. First input data 500 may encompass metadata including information for a description of the domain model. In the example, first input data 500 include domain knowledge concerning the visible domain. Domain knowledge concerning the visible domain includes, for example, visible hazards for an object or subject in the domain, or factors that influence a behavior of an object or subject in the visible domain. In the example, the domain knowledge is contained in dimensions and options that are defined for digital images. The domain knowledge may be defined by dimensions and options for a digital image. Additionally or alternatively, the domain knowledge may be defined by dimensions and options for variations of sensor-specific parameters over time, for example conditions such as pressure or temperature. The first input data may also encompass constraints.

Second input data 502 may also be provided. In the example, second input data 502 include a set of already existing test cases. The set may be an empty set. A test case or a set of existing test cases is added by second input data 502. For example, the image data may be predefined.

At least one of the options is associated with at least one of the dimensions in a step 504 as a function of information concerning the dimensions and options for at least one test case for the machine learning. In the example, a test case includes a combination of options. In the example, a test case includes a plurality of dimensions. In the example, an option is defined for each dimension of the test case. For example, a morphological analysis of the domain is carried out as a function of first input data 500. The description for domain model 506 that associates the dimensions and options with one another is determined in the morphological analysis.

Information for the description of domain model 506 may be contained in metadata for first input data 500.

In the example, the morphological analysis is carried out with the aid of the method and SCODE software. The operation of the SCODE software may be executed manually, i.e., by an expert.

Domain model 506 defines a state space. The complete state space of domain model 506 is preferably determined. The state space includes the states which according to the description are defined by combinations of options of all dimensions. This means that a distinction is made between valid and invalid states, based on the description for domain model 506.

In the example, domain model 506 is determined from the description of the domain model with the aid of the method and the SCODE software. Domain model 506 may encompass a Zwicky box, for example as illustrated in FIG. 4, or multiple Zwicky boxes. Each Zwicky box is defined by a specific selection of dimensions with the options for each dimension that are possible in each case. Constraints are provided; i.e., a limitation or subset of the possible states is taken into account. The Zwicky boxes in the domain model define the possible space for states. A specific set of states is not yet defined.

A set of test cases 510 is determined in a step 508 as a function of second input data 502 and as a function of domain model 506. The set of test cases 510 defines a specific set of states, each state being a specific selection of an option for each dimension.

The set of test cases 510 may encompass at least one test case from second input data 502.

A combination of options for a subset of the dimensions that are present in the set of test cases 510 is determined in a step 512.

In the example, a k-wise coverage is analyzed by the set of test cases 510. In the example, a k-wise coverage of all dimensions of the domain model is determined by the set of test cases 510. In this case, k denotes the number of dimensions of the domain model that are combined for a subset of dimensions. If constraints are provided, the coverage may be determined taking these constraints into account. For example, at least one combination of multiple dimensions for the k-wise coverage is determined in compliance with the at least one constraint.

In the example, for a subset of the dimensions a check is made as to whether the set of test cases 510 encompasses at least one test case that includes this subset of dimensions. The subset is covered when the subset and the test case encompass the same combination of options in all dimensions. A check is made as to whether the set of test cases 510 encompasses all test cases that are necessary for achieving the coverage. In the example, a check is made as to whether at least one subset from the plurality of subsets exists which is not covered by the set of test cases 510.

In the example, the k-wise coverage is achieved with the aid of the combinatorial tool PICT. A subset that is not yet covered by a test case of the set of test cases 510, or all subsets that are not yet covered by this set, is/are preferably determined.

In the example, this results in a report 514 that encompasses a degree of coverage and/or test cases still lacking. In the event of incomplete coverage, report 514 includes at least one combination of dimensions that is not yet covered.

A test case is determined in a step 516 for a combination that is lacking in the set of test cases 510. For a combination for which the set of test cases 510 does not include a test case that covers this combination for the machine learning, a test case is determined as a function of the dimensions of the options associated with these dimensions. In the example, as a function of report 514, at least one test case is determined for at least one not yet covered combination of options. The at least one test case is defined, for example, by a combination of a first option with a second option. In the example, the first option is an option from a first plurality of options that is defined for a first dimension. In the example, the second option is an option from a second plurality of options that is defined for the first dimension or for a second dimension. These are determined in such a way that the not yet covered combination and the test case encompass the same combination of options. A plurality of test cases that covers multiple combinations or all combinations not yet covered is preferably determined.

It may be provided to store the test case or the test cases for a subsequent use in a test or as second input data. In particular, it may be provided to carry out the following steps independently of the steps described above, in particular in separate devices.

It may be provided to take an additional dimension into account when first test cases of the set of test cases 510 have already been determined without this dimension. For example, an additional dimension is additionally defined with a first option and a second option.

In this case, the first test cases are defined by options for a first dimension and a second dimension. On this basis, second test cases may be determined that are defined by options for the first dimension, the second dimension, and a third dimension. For determining the second test cases, it may be provided to associate the first test cases with an option for the third dimension. A first option and a second option are preferably defined for the third dimension. When the additional dimension may include multiple options, the already known test cases are associated with one of the options. New test cases may be determined for the newly created states that are not covered by existing test cases.

The set of test cases 510 for the machine learning is output in a step 518. In the example, the set of test cases is output when the set of test cases encompasses a test case for the states of the subset of states.

It may be provided to map a test case of the set of test cases onto a specific test case. All test cases are preferably mapped onto specific test cases. Model 102 may be tested with a specific test case. In the example, the specific test case is a digital image. For monitored machine learning, the specific test case may encompass the digital image and a label or multiple labels which are defined by the test case. For unmonitored machine learning, the specific test case may encompass the digital image independently of a label. In the present example, the test case describes parameters for determining a digital image in the visible domain. In the present example, the at least one digital image is determined according to the parameters.

The digital image is generated, for example, in a simulation whose parameters are defined by the test case. A field test via which the digital image is detected may also be provided. In this case, the test case defines parameters of the field test. It may also be provided that the test case characterizes a digital image from a database. In this case, a digital image, in particular a digital image including at least one label, that is identified by the test case may be withdrawn from the database as a specific test case.

A set of specific test cases is preferably determined for a plurality of test cases.

It is provided to divide the set of specific test data into subsets in a step 520. For example, k subsets are generated for a k-fold cross-validation. If constraints are provided, the subsets are determined in compliance with the constraints. The set of specific test cases is preferably subdivided in such a way that a uniform k-wise coverage over the subsets is achieved.

It is provided to assign weights for specific test cases in a step 522. For example, a frequency of an occurrence of specific test cases that cover a certain state is determined. A particular frequency of the occurrence in the test cases is preferably determined for a plurality of states. It may be provided to associate a first weight with a first state. It may be provided to associate a second weight with a second state that is different from the first state. It may be provided to determine a first frequency for the first state. It may be provided to determine a second frequency for the second state. It is preferably provided that the first weight is greater than the second weight when the first frequency is less than the second frequency.

An uncommon covered state in the specific test cases is thus weighted more heavily.

It may be provided to subdivide specific test cases into the subsets as a function of the weights. For states with a weight that is high compared to other states, the specific test cases are preferably categorized into a subset for training data. In this case, specific test cases for the other states are categorized into a subset for test data or validation data.

In one example, a weight, that indicates how uncommon the specific test case is, is associated with each specific test case. Digital images as specific test cases are, for example, provided with a Zwicky box.

Sky: dark, normal, light
Person: child, adult
Distance: near, far a First Test Case is Defined as Sky: dark
Person: child
Distance: near a Second Test Case is Defined as Sky: dark
Person: adult
Distance: near a Third Test Case is Defined as Sky: normal
Person: child
Distance: near A plurality of specific test cases may be present for each of these test cases. In the example, 20 first specific test cases are present for the first test case, 5,000 second specific test cases are present for the second test case, and 500 third specific test cases are present for the third test case.

In this case, the weight for the particular test case may be determined as a function of the number of specific test cases present for this test case. In the example, a first weight w_1=1/20 is determined for the first specific test cases. In the example, a second weight w_2=1/5,000 is determined for the second specific test cases. In the example, a third weight w_3=1/500 is determined for the third specific test cases.

For example, for a cross-validation method a formation of subsets with the aid of a stratified random sample is provided, via which individual test cases are associated with each of the subsets.

This prevents a subset from having a bias, i.e., a nonrepresentative distribution of the test cases of the domain model.

The test cases from subsets that are under-represented in one of the subsets may be weighted more heavily in a new stratified random sample than for other test cases in this subset. Test cases that are over-represented in a subset may be weighted lower than other test cases that are under-represented in the subset.

The subsets may be stored. The subsets may be used for a test 524, a validation 526, or a further training 528.

Due to the use of the morphological analysis of the domain, in particular with the aid of the method and the SCODE software and the use of the combinatorial test, weaknesses and test cases yet to be carried out may be identified and/or determined, and test data for this purpose may be generated.

For an iterative repetition of the generation of test cases, it may be provided, prior to a new iteration, to predefine an additional dimension which thus far has not been taken into account. This may take place based on a plan that is determined as a function of the number or type of combinations that are lacking, i.e., not yet covered. When an additional dimension for the domain model is provided, based on the plurality of the test cases that is defined for the domain model without the additional dimension, a set of test cases for the domain model with the additional dimension is determined. It may be provided to associate the already known test cases in the set of test cases with an option of the additional dimension. In this case, new test cases are determined only for combinations with other options of the additional dimension. The set of test cases, for example in a subsequent iteration, is the plurality of the abstract test cases.

For example, a first option and a second option are defined for the additional dimension. In this case, all test cases from the plurality of test cases may be associated with the first state. The additional combinations are determined for the second state. In this case, the set of test cases for the domain model with the third dimension includes all test cases from the already known plurality of test cases, and additionally the test cases that are determined as a function of the additional combination.

If the additional dimension may include multiple options, the already known test cases are associated with one of the options. For the others, new test cases are determined.

What is claimed is:

1. A computer-implemented method for machine learning using a set of test cases, comprising the following steps:

providing first input data which encompass information concerning dimensions and options for the machine learning;

associating at least one of the options with at least one of the dimensions as a function of information concerning the dimensions and options for at least one test case for the machine learning;

determining a combination of the options for a subset of the dimensions that is lacking in the set of test cases; and determining a test case for the combination, wherein specific test cases corresponding to a set of specific test cases are determined from the set of test cases, wherein a weight is determined as a function of a number of the specific test cases, the set of specific test cases being divided into subsets, at least one specific test case of the specific test cases being associated or not associated with one of the subsets as a function of the weight, and wherein a plurality of the specific test cases is determined as training data for a training, or as validation data for a validation, or as test data for a test for machine learning, wherein in order to prevent the subsets from having a bias corresponding to a nonrepresentational distribution of the test cases, the subsets are formed according to a stratified random sample in which individual test cases are associated with each of the subsets, wherein:

at least one subset of the dimensions is determined as a function of at least one constraint that defines at least one permissible and/or at least one impermissible combination of multiple dimensions or options, a k-wise coverage is determined by the set of test cases, wherein k define a number of dimensions that are combined with one another in a subset of the dimensions, at least one combination of multiple dimensions for the k-wise coverage is determined in compliance with the at least one constraint, and the constraint is a boundary condition that defines a permissible or impermissible combination of options of a Zwicky box from a plurality of Zwicky boxes.

2. The method as recited in claim 1, further comprising:

providing second input data which encompass at least one test case, and the set of test cases being determined from the second input data as a function of at least one test case.

3. The method as recited in claim 1, wherein a number of dimensions or options is selected from a plurality of dimensions or options as a function of a weighting that characterizes an importance for the machine learning.

4. The method as recited in claim 1, wherein a check is made as to whether the set of test cases encompasses at least one test case for each subset of the at least one subset of the dimensions.

5. The method as recited in claim 1, wherein a subset of the dimensions that is not yet covered by a test case of the set of test cases is determined, at least one test case being determined for the not yet covered subset of dimensions.

6. The method as recited in claim 1, wherein each of the test cases is defined by a combination of a first option with a second option, the first option being an option from a first plurality of options that is defined for a first dimension, the second option being an option from a second plurality of options that is defined for the first dimension or for a second dimension.

7. The method as recited in claim 1, wherein first test cases of the set of test cases are defined by options for a first dimension and a second dimension, second test cases being determined that are defined by options for the first dimension, the second dimension, and a third dimension, the first test cases for determining the second test cases being associated with an option for the third dimension.

8. A computer processing device for machine learning using a set of test cases, the computer processing device configured to:

provide first input data which encompass information concerning dimensions and options for the machine learning;

associate at least one of the options with at least one of the dimensions as a function of information concerning the dimensions and options for at least one test case for the machine learning;

determine a combination of the options for a subset of the dimensions that is lacking in the set of test cases; and determine a test case for the combination, wherein specific test cases corresponding to a set of specific test cases are determined from the set of test cases, wherein a weight is determined as a function of a number of the specific test cases, the set of specific test cases being divided into subsets, at least one specific test case of the specific test cases being associated or not associated with one of the subsets as a function of the weight, and wherein a plurality of the specific test cases is determined as training data for a training, or as validation data for a validation, or as test data for a test for machine learning, wherein in order to prevent the subsets from having a bias corresponding to a nonrepresentational distribution of the test cases, the subsets are formed according to a stratified random sample in which individual test cases are associated with each of the subsets, wherein:

at least one subset of the dimensions is determined as a function of at least one constraint that defines at least one permissible and/or at least one impermissible combination of multiple dimensions or options, a k-wise coverage is determined by the set of test cases, wherein k define a number of dimensions that are combined with one another in a subset of the dimensions, at least one combination of multiple dimensions for the k-wise coverage is determined in compliance with the at least one constraint, and the constraint is a boundary condition that defines a permissible or impermissible combination of options of a Zwicky box from a plurality of Zwicky boxes.

9. A non-transitory computer-readable storage medium on which is stored a computer program including computer-readable instructions for machine learning using a set of test cases, the instructions, when executed by a computer, causing the computer to perform the following steps:

providing first input data which encompass information concerning dimensions and options for the machine learning;

associating at least one of the options with at least one of the dimensions as a function of information concerning the dimensions and options for at least one test case for the machine learning;

determining a combination of the options for a subset of the dimensions that is lacking in the set of test cases; and determining a test case for the combination, wherein specific test cases corresponding to a set of specific test cases are determined from the set of test cases, wherein a weight is determined as a function of a number of the specific test cases, the set of specific test cases being divided into subsets, at least one specific test case of the specific test cases being associated or not associated with one of the subsets as a function of the weight, and wherein a plurality of the specific test cases is determined as training data for a training, or as validation data for a validation, or as test data for a test for machine learning, wherein in order to prevent the subsets from having a bias corresponding to a nonrepresentational distribution of the test cases, the subsets are formed according to a stratified random sample in which individual test cases are associated with each of the subsets, wherein:

at least one subset of the dimensions is determined as a function of at least one constraint that defines at least one permissible and/or at least one impermissible combination of multiple dimensions or options, a k-wise coverage is determined by the set of test cases, wherein k define a number of dimensions that are combined with one another in a subset of the dimensions, at least one combination of multiple dimensions for the k-wise coverage is determined in compliance with the at least one constraint, and the constraint is a boundary condition that defines a permissible or impermissible combination of options of a Zwicky box from a plurality of Zwicky boxes.

10. The method as recited in claim 1, wherein:

the machine learning is executed in a system that includes a model and a tool chain, the tool chain includes a first tool for a morphological analysis of a domain corresponding to a plurality of possible states defined by a set of permissible combination possibilities for the dimensions and options, and according to the morphological analysis the first tool predefines the model.

11. The computer processing device as recited in claim 8, wherein:

the machine learning is executed in a system that includes a model and a tool chain, the tool chain includes a first tool for a morphological analysis of a domain corresponding to a plurality of possible states defined by a set of permissible combination possibilities for the dimensions and options, and according to the morphological analysis the first tool predefines the model.

12. The non-transitory computer-readable storage medium as recited in claim 9, wherein:

the machine learning is executed in a system that includes a model and a tool chain, the tool chain includes a first tool for a morphological analysis of a domain corresponding to a plurality of possible states defined by a set of permissible combination possibilities for the dimensions and options, and according to the morphological analysis the first tool predefines the model.

* * * * *